US008868256B2

(12) United States Patent
Waid

(10) Patent No.: US 8,868,256 B2
(45) Date of Patent: Oct. 21, 2014

(54) RELATIVE NAVIGATION FOR AERIAL REFUELING OF AN UNMANNED AERIAL VEHICLE

(75) Inventor: James D. Waid, Bradenton, FL (US)

(73) Assignee: Honeywell International Inc., Morristown, NJ (US)

( * ) Notice: Subject to any disclaimer, the term of this patent is extended or adjusted under 35 U.S.C. 154(b) by 2866 days.

(21) Appl. No.: 11/434,539

(22) Filed: May 15, 2006

(65) Prior Publication Data

US 2009/0326736 A1    Dec. 31, 2009

(51) Int. Cl.
*B64D 39/00* (2006.01)
(52) U.S. Cl.
USPC .............. 701/3; 244/135 A; 340/961; 701/23; 701/9; 701/301
(58) Field of Classification Search
USPC ......... 701/3–4, 7–9, 300–301, 207, 213–214, 701/23; 244/135 A, 1 TD, 3.15; 340/961; 342/358; 141/382
See application file for complete search history.

(56) References Cited

U.S. PATENT DOCUMENTS

| 5,760,737 | A | 6/1998 | Brenner ........................ 342/357 |
| 6,270,038 | B1 | 8/2001 | Cycon et al. ................. 244/12.3 |
| 6,856,894 | B1 | 2/2005 | Bodin et al. |
| 6,889,941 | B1 | 5/2005 | McElreath et al. ....... 244/135 A |
| 7,021,586 | B2 | 4/2006 | Bolling ..................... 244/135 A |
| 7,469,863 | B1* | 12/2008 | Speer ........................ 244/135 A |
| 7,474,962 | B2 | 1/2009 | Waid et al. |
| 2005/0033488 | A1 | 2/2005 | Wittenberg |
| 2005/0060092 | A1 | 3/2005 | Hablani ........................ 701/213 |
| 2005/0114023 | A1* | 5/2005 | Williamson et al. .......... 701/214 |
| 2006/0015247 | A1 | 1/2006 | Speer |
| 2006/0074558 | A1* | 4/2006 | Williamson et al. .......... 701/213 |
| 2007/0219720 | A1* | 9/2007 | Trepagnier et al. ........... 701/300 |

FOREIGN PATENT DOCUMENTS

| EP | 1424283 | 6/2004 |
| EP | 1424283 A1 * | 6/2004 |
| EP | 1868008 A1 * | 12/2007 |
| WO | 9807623 | 2/1998 |
| WO | WO 9807623 A1 * | 2/1998 |
| WO | WO 2008134606 A1 * | 11/2008 |

OTHER PUBLICATIONS

"Vision Based Sensor and Navigation System for Autonomous Aerial Refueling"; John Valasck et al.; Texas A & M University; Texas; pp. 1-9.*
"Guided Drogue Flight Test Report"; Technical Report No. E-23027; Beech Aircraft Corporation; Wichita, Kansas; Naval Air Systems Command; Sep. 6, 1977; p. 14.*

(Continued)

*Primary Examiner* — Cuong H Nguyen
(74) *Attorney, Agent, or Firm* — Fogg & Powers LLC

(57) ABSTRACT

A method and system for navigating an unmanned aerial vehicle (UAV) for aerial refueling is described. A system processor in the UAV receives navigation data from a tanker aircraft and calculates a plurality of relative navigation solutions with respect to the tanker aircraft. The system processor compares the plurality of relative navigation solutions to identify any inconsistent solutions. The inconsistent solutions are discarded and the system processor navigates the UAV in position for refueling using the remaining relative navigation solutions.

9 Claims, 3 Drawing Sheets

(56) References Cited

OTHER PUBLICATIONS

Franchi La P., "Tether Cable Offers Lines for Research Australia Backs Study to Explore Airborne Payload Delivery", Flight Internationak Reed Business Information, Sutton Surrey, GB vol. 166, No. 4955, Oct. 12, 2004, p. 30, XP001201173.*

Flug Revue, "Airbus (Air Tanker) A330-200 Tanker," Jan. 26, 2004; www.flug-revue.rotor.com/FRTypen/FRA3302T.htm; Motorp-Presse Stuttgart, Bonn, German (5 pgs).*

Thales Avionics Ltd., "Air Tanker Bids for Future Strategic Tanker Aircraft," Jul. 3, 2001; www.thalesavionics.net/press/pr43.html; (3 pgs).* http://www.aviationtoday.com/print/av/categories/military/669.html, Smart Tanker.*

Machine Vision/GPS Integration Using EKF for the UAV Aerial Refueling Problem; Mammarella, M.et al.; Systems, Man, and Cybernetics, Part C: Applications and Reviews, IEEE Transactions on; Vol: 38, Issue: 6; Digital Object Id: 10.1109/TSMCC.2008.2001693; Publication Year: 2008, pp. 791-801.*

A comparison of Pose Estimation algorithms for Machine Vision based Aerial Refueling for UAVs; Campa, G. et al.; Control and Automation, 2006. MED '06. 14th Mediterranean Conference on; Digital Object Identifier: 10.1109/MED.2006.328769 Publication Year: 2006, pp. 1-6.*

Vision-Based Autonomous Probe and Drogue Aerial Refueling; Mati, R.; Pollini, L.; Lunghi, A.; Innocenti, M.; Campa, G. Control and Automation, 2006. MED '06. 14th Mediterranean Conf. on; Digital Object Id: 10.1109/MED.2006.328794 .Pub. Year: 2006, pp. 1-6.*

Vision based controller for autonomous aerial refueling; Kimmett, J.; Valasek, J.; Junkins, J.L.;Control Applications, 2002. Proceedings of the 2002 International Conference on; vol. 2; Digital Object Identifier: 10.1109/CCA.2002.1038765 Publication Year: 2002, pp. 1138-1143 vol. 2.*

"Nasa Dryden Exploring UAV Aerial Refueling Technologies", Dec. 19, 2002, www.nasa.gov/1b/centers/dryden/news/NewsReleases/2002/02-68.html.

Bosely et al., "For Using Shipboard —Relative GPS," GPS World Apr. 1, 2005. www.gpsworld.com/gpsworld/content/printContentPopup.jsp ?id=154867.

U.S. Appl. No. 11/180,294, filed Jul. 13, 2005.

* cited by examiner

RELATIVE NAVIGATION FOR AERIAL REFUELING OF AN UNMANNED AERIAL VEHICLE

FIELD

The present invention relates generally to an unmanned aerial vehicle, and more particularly, relates to a system and method for determining relative position and providing integrity for the relative solution to be used for aerial refueling of the unmanned aerial vehicle.

BACKGROUND

An unmanned aerial vehicle (UAV) is a remotely piloted or self-piloted aircraft that can carry cameras, sensors, communications equipment, and/or other payloads. UAVs have been used in a reconnaissance and intelligence-gathering role since the 1950s. Today, UAVs are used for additional purposes, such as target acquisition and/or designation, data acquisition, communications relay, decoy, jamming, harassment, ordinance delivery, and supply flights. This increased role of the UAVs has lead to many advancements in UAV design.

A UAV is generally designed to be recoverable and reusable for multiple missions. There are many UAV designs, including fixed-wing type configurations, helicopter type configurations, and ducted type configurations. Each of these designs has a limited range. Typically, a UAV having a fixed-wing type configuration can travel further than a UAV with either a helicopter type or a ducted type configuration. However, regardless of the design, the UAV stops flying when the aircraft runs out of fuel.

As the role of the UAV increases, it would be beneficial to increase the range and loiter time of the UAV. One way to increase the mission duration of the UAV is to allow the UAV to refuel during a mission. Aerial refueling of military aircraft, such as jet fighters and helicopters, has been done for years. Typically, a tanker aircraft carrying fuel extends a flying boom or probe beneath the tanker aircraft. A pilot maneuvers the receiving aircraft beneath the probe, connecting the probe to a receptacle on the exterior of the receiving aircraft. The tanker aircraft supplies fuel to the receiving aircraft once the probe is coupled to the receiving aircraft.

Currently, UAV's do not have the ability to conduct mid-air refueling. Unlike a manned aircraft, the UAV does not have a pilot that can maneuver the aircraft into position relative to the tanker aircraft and maintain the relative position during refueling. The UAV lacks relative navigation capabilities, which would guide the UAV to a tanker aircraft. Relative navigation refers to providing a navigation solution that takes into account the relative location of two moving objects. It is much easier to navigate a moving object to a fixed position, such as landing an aircraft on a runway. Because both the UAV and the tanker aircraft are moving with respect to the earth during mid-air refueling, the navigation solution is much more complex.

Thus, it would be beneficial to provide the UAV with highly reliable relative navigation capabilities with a high degree of confidence that would allow the UAV to safely and efficiently rendezvous with the tanker aircraft for aerial refueling. As a result, the UAV may be used on longer and/or more complex missions.

SUMMARY

A method and system of relative navigation with integrity for aerial refueling an unmanned aerial vehicle (UAV) is described. A method for aerial refueling the UAV includes calculating a plurality of relative navigation solutions between the UAV and a tanker aircraft, comparing the plurality of relative navigation solutions to identify relative navigation solutions that are within a threshold value of each other, and navigating the UAV with respect to the tanker aircraft using the relative navigation solutions that are within the threshold value of each other. The confidence in the resulting solution forms the basis for providing integrity for the relative navigation solution.

Calculating the plurality of relative navigation solutions may include calculating a plurality of relative vectors between the UAV and the tanker aircraft. Calculating the plurality of relative navigation solutions may include calculating a navigation solution for each of the unmanned aerial vehicle and the tanker aircraft selected from the group consisting of a Global Positioning System (GPS)-only solution, a loosely coupled GPS/INS solution, and a tightly coupled GPS/INS solution. In one example, calculating the plurality of relative navigation solutions includes taking a difference between data obtained from the tanker aircraft and the unmanned aerial vehicle to obtain a loosely coupled relative navigation solution. In another example, calculating a plurality of relative navigation solutions includes using a Kalman filter to obtain a tightly coupled relative navigation solution. Additionally, calculating the plurality of relative navigation solutions may depend on a distance between the UAV and the tanker aircraft and/or on a number of GPS systems and inertial systems located in the UAV and the tanker aircraft.

The threshold may be adjusted based on the requirements for aerial refueling. Comparing the plurality of relative navigation solutions may detect whether any of the plurality of relative navigation solutions are inconsistent with the other solutions. This consistency information may be used to form a protection level for the plurality of relative navigation solutions.

The method may also include identifying a GPS receiver or an inertial sensor that is malfunctioning if at least one of the plurality of relative navigation solutions exceeds the threshold value.

In one example, a system for aerial refueling the UAV includes a processor, data storage, and machine language instructions stored in the data storage executable by the processor. The machine language instructions can calculate a plurality of relative navigation solutions between the UAV and the tanker aircraft, compare the plurality of relative navigation solutions to identify relative navigation solutions that are within a threshold value of each other, and navigate the UAV with respect to the tanker aircraft using the relative navigation solutions that are within the threshold value of each other.

In another example, a system for aerial refueling the UAV includes an INS, a GPS, and a system processor that receives data from the INS, the GPS, and the tanker aircraft. The system processor calculates a plurality of relative navigation solutions between the UAV and the tanker aircraft based on the received data, compares the plurality of navigation solutions to detect whether any of the plurality of relative navigation solutions is inconsistent with the other solutions, and uses consistency information obtained from the comparison to form a protection level for the plurality of relative navigation solutions. The system may also include a navigation processor that receives the data from the INS and the GPS, and provides information regarding the unmanned aerial vehicle to the system processor.

The plurality of relative navigation solutions may be a plurality of relative vectors between the UAV and the tanker aircraft. The plurality relative navigation solutions may be calculated using a navigation solution for each of the unmanned aerial vehicle and the tanker aircraft selected from the group consisting of a GPS-only solution, a loosely coupled GPS/INS solution, and a tightly coupled GPS/INS solution. In one example, the plurality of relative navigation solutions is calculated by taking a difference between data obtained from the tanker aircraft and the unmanned aerial vehicle to obtain a loosely coupled relative navigation solution. In another example, the plurality of relative navigation solutions is calculated by using a Kalman filter to obtain a tightly coupled relative navigation solution. Additionally, the plurality of relative navigation solutions may depend on a distance between the unmanned aerial vehicle and the tanker aircraft and/or a number of GPS systems and inertial systems located in the UAV and the tanker aircraft.

The system processor may also identify a GPS receiver or an inertial sensor that is malfunctioning if at least one of the plurality of relative navigation solutions is inconsistent with the other solutions.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
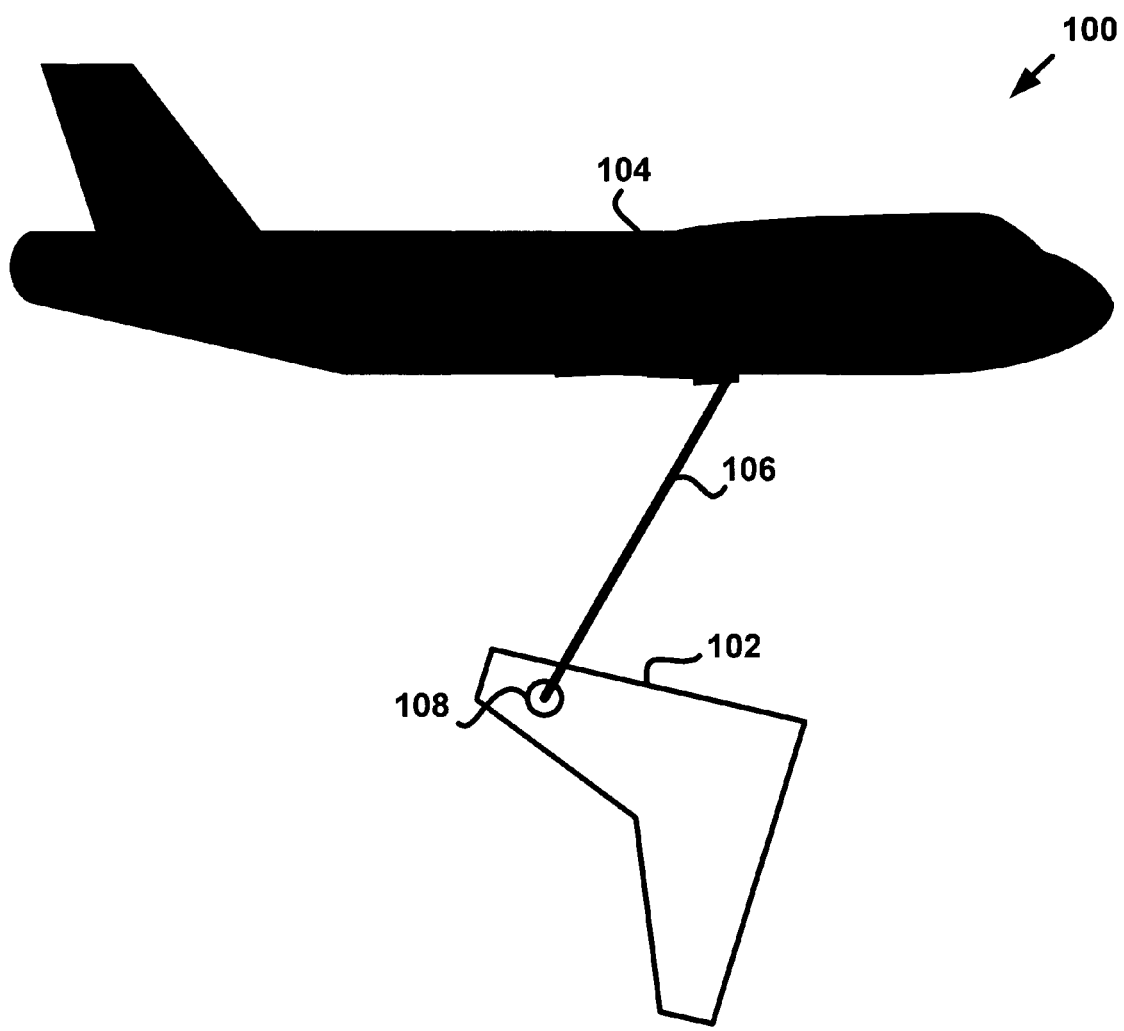
FIG. 1 is a block diagram depicting aerial refueling of a UAV, according to an example.

FIG. 1 is a block diagram 100 depicting aerial refueling of a UAV 102. The UAV 102 may refuel in-flight with a tanker aircraft 104. The UAV 102 may be any type of UAV, while the tanker aircraft 104 may be any type of aircraft used for refueling other aircraft, such as jet fighters and helicopters. For example, the tanker aircraft 104 may be a KC-10, a KC-130, or a KC-135. Preferably, the tanker aircraft 104 is designed for boom-type transfers in which a boom operator extends and maneuvers a boom to establish a connection to transfer fuel from the tanker aircraft 104 to the UAV 102.

Prior to refueling, the tanker aircraft 104 extends a refueling probe 106. The refueling probe 106, when fully extended, may be long enough for the UAV 102 to safely approach and connect to the refueling probe 106. The distal end of the refueling probe 106 connects to a receptacle 108 on an exterior of the UAV 102. The aerial refueling system used to refuel the UAV 102 may be substantially the same as refueling systems used to refuel manned aircraft in-flight, such as a flying boom system. Alternatively, the aerial refueling system may be custom designed for the UAV 102.

The UAV 102 needs to be able to maneuver into position for aerial refueling and maintain its position during the refueling. The UAV 102 includes a navigation system that may be used for positioning the UAV 102 during aerial refueling. The UAV's navigation system receives inertial and Global Positioning System (GPS) measurement data from the tanker aircraft 104 via a data link. The navigation system then uses the inertial and GPS data for both the tanker aircraft 104 and the UAV 102 to compute a relative navigation solution, otherwise referred to as a relative vector. Preferably, the relative navigation solution is a GPS Real-Time Kinematic (RTK)/INS tightly coupled relative navigation solution. The relative navigation solution is calculated based on what data is available to the navigation system and allows the UAV 102 to accurately and confidently maintain its relative position to the tanker aircraft 104. The UAV's navigation system is described with reference to FIG. 2. Additional details regarding calculating the relative vector can be found in U.S. patent application Ser. No. 11/180,295, titled "Methods and Systems of Relative Navigation for Shipboard Landings" assigned to the same assignee as the present application. U.S. patent application Ser. No. 11/180,295 is hereby incorporated by reference.

Figure 2:
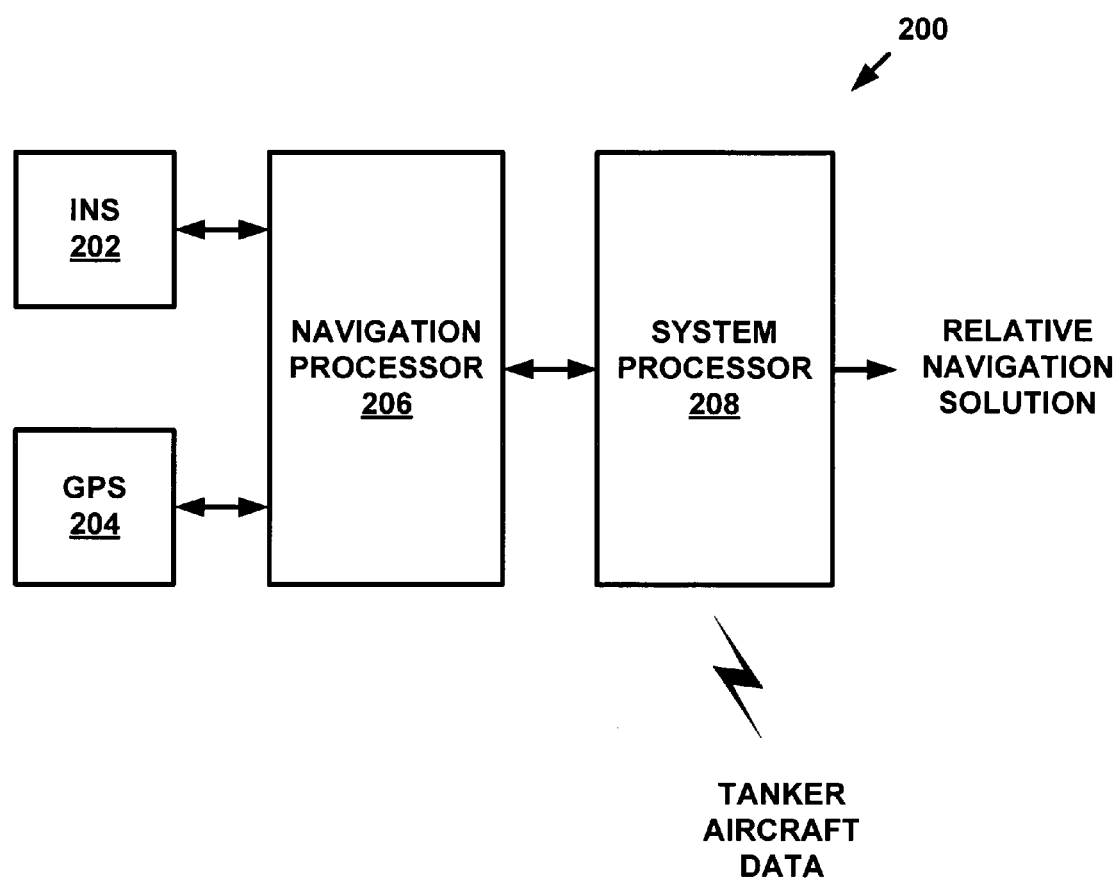
FIG. 2 is a block diagram of a navigation and guidance system for use in the UAV depicted in FIG. 1, according to an example.

FIG. 2 is a block diagram of a navigation system 200 for use in the UAV 102 depicted in FIG. 1. The navigation system 200 includes an Inertial Navigation System (INS) 202, a GPS 204, a navigation processor 206, and a system processor 208. The navigation system 200 may also include additional entities not shown in FIG. 2, such as a magnetometer, an air data computer, and antennas for the data link and the GPS sensors. The navigation system 200 receives inertial and GPS data from the tanker aircraft 104 via the data link.

The INS 202 may provide acceleration and angular rate data for the UAV 102. The tanker aircraft 104 may include a similar INS for generating inertial data to be transmitted to the UAV 102. Typically, the INS 202 relies on three orthogonally mounted acceleration sensors and three nominally orthogonally mounted inertial angular rate sensors, which can provide three-axis acceleration and angular rate measurement signals. For example, the INS 202 may include three accelerometers and three gyroscopes.

The three accelerometers and three gyroscopes may be packaged together with a processor, associated navigation software, and inertial electronics. The inertial electronics may be used to convert the acceleration and angular rate data obtained by the INS 202 into a digital representation of the data. Additionally, the inertial electronics may compensate the acceleration and angular rate data using compensation data obtained from the navigation processor 206.

The GPS 204 may receive data from one or more satellites. The satellites may broadcast signals containing ephemeris data that accurately describes the orbits of the satellites. The satellites transmit two or more L-band signals, which may be used for positioning purposes. These signals, named L1 and L2 in the current GPS system, also referred to as the carriers, may be generated from a fundamental satellite clock frequency of 10.23 MHz. Currently L1 has a frequency of 1575.42 MHz, while L2 has a frequency of 1227.60 MHz.

The GPS 204 may provide three-dimensional position, velocity, and time (PVT) information for the UAV 102. Additionally, the GPS 204 may provide pseudorange and deltarange (PR/DR) information in the form of an integrated GPS carrier phase measurement. Additionally, an estimate of heading may be computed using the information from the GPS 204. The tanker aircraft 104 may include a similar GPS for generating GPS data (PVT, PR/DR, and/or heading) to be transmitted to the UAV 102 via the data link.

Typically, the GPS 204 is used in conjunction with the INS 202 to provide a more robust navigation solution. The INS 202, alone or in conjunction with other aids, may provide data to the GPS 204 when a satellite signal is temporarily lost due to interference. The GPS 204 may use the INS data to quickly regain a lost satellite signal. Additionally, the INS 202 may use GPS data for initialization, calibration, and/or aiding.

The type of relative navigation solution provided by the system processor 208 depends on the type of data available to the system processor 208. The relative position may be a simple difference of the platform (i.e., the UAV 102 and the tanker aircraft 104) reported PVTs of a uniquely derived integrated relative GPS/INS solution. The types of platform navigation solutions include a GPS-only solution, a loosely coupled GPS/INS solution, and a tightly coupled GPS/INS solution that incorporates any combination of the other solutions.

In addition to the platform PVT solutions, measurement data from both platforms may also available and be used to compute the relative solution independently of the PVT solutions being provided by each platform. It is important to note that the relative navigation solution is not limited to these solutions. For example, the relative navigation solution may also be an ultra-tightly coupled solution.

A loosely coupled platform solution integrates data from the INS 202 and the GPS 204 in the position domain. The GPS 204 passes PVT information obtained from four satellites to the navigation processor 206. When the GPS 204 receives data from less than four satellites, the GPS data may have a limited use in calculating the PVT solution. The INS 202 uses the PVT information to correct inertial errors that are commonly associated with the INS 202 operation, which is typically mechanized in a Kalman filter.

In addition, the loosely coupled system may include a feedback path in which the navigation processor 206 may pass velocity, acceleration, and/or angular rate information to the GPS 204. A GPS receiver may use this information from the feedback path when tracking satellites and to re-acquire a satellite signal that has been lost, which is sometimes referred to as receiver aiding.

In a tightly coupled system, the INS 202 data and the GPS 204 data are combined in the measurement domain. The GPS 204 provides pseudorange and/or deltarange data to the navigation processor 206. The GPS 204 contains tracking loops for tracking data from multiple satellites. The tracking loops provide pseudorange and deltarange measurements to the INS 202. The pseudorange measurements are an output of a delay lock loop, which is used for tracking code phase; while the deltarange measurements are an output of a phase lock loop, which is used for tracking carrier phase. The pseudorange and deltarange measurements may be used by a Kalman filter in the navigation processor 206 to estimate various sensor (inertial and/or GPS) errors.

In the tightly coupled system, the GPS 204 sends pseudorange and deltarange to the navigation processor 206 for all satellites that are being tracked. The navigation processor 206 may continue to use the data obtained from the GPS 204 even when fewer than four satellite signals are being tracked. The navigation processor 206 in a tightly coupled system may continue to use the GPS data with less than four available satellites because each pseudorange and deltarange measurement is an independent measurement.

FIG. 2 depicts the INS 202 and the GPS 204 as standalone units. However, the INS 202 and the GPS 204 may be combined into a single unit. One or more embedded GPS/INS (EGI) systems may be used in the UAV 102 and/or the tanker aircraft 104. For example, a standard or modified Honeywell H-764 advanced configurable EGI (ACE) navigator may be used in the UAV 102 and/or the tanker aircraft 104.

The system processor 208 may include any combination of hardware, firmware, and/or software operable to receive and process the data from the navigation processor 206 and the tanker aircraft 104, and provide as an output a relative navigation solution. The tanker aircraft 104 provides its inertial and GPS measurement data to the UAV 102 via the data link. The system processor 208 uses measurement data from both the UAV 102 and the tanker aircraft 104 to compute a relative vector between the UAV 102 and the tanker aircraft 104.

The relative vector is calculated using the available data and processing techniques. A summary of possible relative navigation solutions are provided in Table 1. A fixed solution is possible when a double difference (DD) process is able to confidently resolve the carrier phase DD integer ambiguities. A float solution is available when there exists five or more common sets (i.e., common to the UAV 102 and the tanker aircraft 104) of GPS pseudorange and carrier phase. Relative GPS (RGPS) refers to a GPS-based relative solution that does not take into account the inertial measurement data from either the UAV 102 or the tanker aircraft 104. Coupled or blended solutions integrate the available data (both GPS and INS) to form a relative vector between the UAV 102 and the tanker aircraft 104.

TABLE 1

| Relative Navigation Solution | Data | Processing |
| --- | --- | --- |
| Fixed RGPS Dual Frequency (GPS only) | Common GPS pseudorange (PR) and carrier phase (CP) data (both L1 and L2) from both platforms | Fixed CP DD integer ambiguities |
| Fixed RGPS Single Frequency (GPS only) | Common GPS PR and CP data (either L1 or L2) from both platforms | Fixed CP DD integer ambiguities |
| RGPS Floating Solution (GPS only) | Common GPS PR and CP data from both platforms | |
| RGPS Code Based (GPS only) | Common GPS PR data from both platforms | |
| Tightly Coupled RGPS/INS | Inertial and GPS PR and CP measurement data from both platforms. Includes fixed and float RGPS solution. | Tightly coupled relative navigation Kalman filter |
| Tightly Coupled RGPS Code Based/Inertial | Inertial and GPS PR measurement data from both platforms. | Tightly coupled relative navigation Kalman filter moded PR only processing |

TABLE 1-continued

| Relative Navigation Solution | Data | Processing |
|---|---|---|
| Loosely Coupled RGPS/INS | Inertial measurement and RGPS PVT solution. | Loosely coupled relative navigation Kalman filter |
| Inertially Propagated RGPS | Latest available RGPS fixed or float and current inertial measurements | Tightly coupled relative navigation Kalman filter. This solution is the relative navigation Kalman filter output in the absence of GPS measurement updates |
| Inertially Propagated RGPS Code Based | Latest available RGPS code based solution and current inertial measurements | Tightly coupled relative navigation Kalman filter moded PR only processing. This solution is the relative navigation Kalman filter output in the absence of GPS measurement updates |
| Tightly Coupled UAV Solution Differenced with Tightly Coupled Tanker Solution | Independently derived (time tagged) UAV EGI blended and tanker blended solutions. | |
| Tightly Coupled UAV Solution with INS Propagated Tanker Solution | Independently derived (time tagged) UAV EGI blended and tanker blended solutions. Latest available tanker velocity and attitude. | Loss of data link. Tanker position is extrapolated in time using last known position, velocity and attitude. |

Depending on the distance between the tanker aircraft 104 and the UAV 102, and the data link message content, the UAV 102 selects the best available solution for relative navigation. The required level of performance, in terms of accuracy and integrity, is a function of the level of safety required for navigation. In general, the closer the UAV 102 is to the tanker aircraft 104, the more accurate the relative navigation solution should be to avoid an unanticipated collision, while maintaining the refueling position. The protection levels associated with the relative vector are a function of the type of measurements available for processing and the confidence in those measurements from the UAV 102 to the tanker aircraft 104. The protection levels associated with the relative vector may also be a function of the range from the UAV 102 to the tanker aircraft 104.

In addition to providing a navigation solution, the navigation system 200 also ensures safety through the computation of integrity parameters. One such integrity parameter is a relative position protection level, which bounds errors for a relative vector to an acceptable level. The relative position protection level may be calculated by comparing relative vectors from different navigation solutions to assess consistency of the solutions.

For example, forming the relative protection levels for each relative position with a loosely coupled relative navigation solution may be computed via a simple difference between the PVT provided by each platform. In addition to receiving the PVT information, the navigation system 200 obtains an associated horizontal protection level (HPL) and vertical protection level (VPL). The HPV and VPL are computed by each EGI that uses a solution separation technique to compute the absolute (i.e., platform) integrity functions. One solution separation technique is described in U.S. Pat. No. 5,760,737, which is assigned to the same assignee as the present application. U.S. Pat. No. 5,760,737 is hereby incorporated by reference.

The relative navigation HPL and VPL may be the root-sum-squares (RSS) of the terms reported from each of the platforms as shown below.

$$HPL_{RNAV} = \sqrt{HPL_{tanker}^2 + HPL_{UAV}^2}$$ and $$VPL_{RNAV} = \sqrt{VPL_{tanker}^2 + VPL_{UAV}^2}.$$

It is recognized that these HPL and VPL solutions may result in an overbounding of errors on the relative navigation position estimate.

As another example, the tightly coupled relative navigation position estimate may be derived from a Kalman filter. The error states for the Kalman filter (where the number of relative navigation solutions is N) include, but are not limited to the following:

$$\Delta x_N = \begin{bmatrix} \delta \Delta R_x \\ \delta \Delta R_y \\ \delta \Delta R_z \end{bmatrix} = \begin{bmatrix} \text{Error in relative position } x \\ \text{Error in relative position } y \\ \text{Error in relative position } z \end{bmatrix}.$$

For each of the solutions, the Kalman filter may also maintain a covariance matrix for the error stated being estimated (P), which is a three by three matrix that estimates the confidence levels in the error estimates.

$$P_N = E[\Delta x_N \Delta x_N^T].$$

The protection levels are based on the differences of the relative position error estimates of each relative navigation solution. For solutions i and j, the Kalman filter forms the statistic:

$$\delta \Delta x_{ij} = \Delta x_i - \Delta x_j = \begin{bmatrix} \delta \Delta R_{ix} - \delta \Delta R_{jx} \\ \delta \Delta R_{iy} - \delta \Delta R_{jy} \\ \delta \Delta R_{iz} - \delta \Delta R_{jz} \end{bmatrix}.$$

This statistic is the difference of the relative position error estimates for two relative navigation solutions. Setting the frame to the tanker aircraft 104 body, the horizontal plane is the x-y plane and the vertical is the z axis. The HPL is defined based on the first two elements of $\delta \Delta x_{ij}$ and the VPL is defined using the third element.

The formation of the VPL is defined by:

$$VPL_{ij} = \delta \Delta x_{ij}(3) + K_{md} * \sqrt{MAX(P_i(3,3), P_j(3,3))}$$

where $K_{md}$ is the scale factor to insure the missed detection probability is being met and $P_N$ is the Kalman filter covariance matrix for solution N. $K_{md}$ is a function of the expected distribution of $\delta\Delta x_{ij}$ and the requirements for integrity of the relative navigation solution. For all of the available relative navigation solutions, the VPL is VPL=max(VPL$_{ij}$) for all combinations of N solutions.

The horizontal protection level is computed in a similar manner except for taking into account both the x and y components.

$$HPL_{ij} = \sqrt{\delta\Delta x_{ij}(1)^2 + \delta\Delta x_{ij}(2)^2} + K_{md}*\sqrt{MAX(\lambda_i,\lambda_j)}$$

where:

$$\lambda_N = \max[eigenvalues(P_N(1\ldots2, 1\ldots2))]$$

For all of the available relative navigation solutions, the HPL is HPL=max(HPL$_{ij}$) for all combinations of N solutions.

With multiple sets of measurement data, it is possible to calculate several relative navigation solutions. For example, if the tanker aircraft 104 has three EGI systems on board and the UAV 102 has two EGI systems on board, the system processor 208 may form up to thirty independent relative navigation solutions as summarized in Table 2. For each of these combinations, there are several possible solutions, such as those solutions described in Table 1.

Table 2 shows different combinations of GPS and INS data for computing the relative navigation solution, where the tanker aircraft 104 EGI systems are designated as A, B, and C; and the UAV 102 EGI systems are designated as 1 and 2.

TABLE 2

| Solution | Tanker | | UAV | |
|---|---|---|---|---|
| | GPS | INS | GPS | INS |
| 1 | A | A | 1 | 1 |
| 2 | A | A | 2 | 2 |
| 3 | B | B | 1 | 1 |
| 4 | B | B | 2 | 2 |
| 5 | C | C | 1 | 1 |
| 6 | C | C | 2 | 2 |
| 7 | A | B | 1 | 1 |
| 8 | A | B | 1 | 2 |
| 9 | A | B | 2 | 1 |
| 10 | A | B | 2 | 2 |
| 11 | A | C | 1 | 1 |
| 12 | A | C | 1 | 2 |
| 13 | A | C | 2 | 1 |
| 14 | A | C | 2 | 2 |
| 15 | B | A | 1 | 1 |
| 16 | B | A | 1 | 2 |
| 17 | B | A | 2 | 1 |
| 18 | B | A | 2 | 2 |
| 19 | B | C | 1 | 1 |
| 20 | B | C | 1 | 2 |
| 21 | B | C | 2 | 1 |
| 22 | B | C | 2 | 2 |
| 23 | C | A | 1 | 1 |
| 24 | C | A | 1 | 2 |
| 25 | C | A | 2 | 1 |
| 26 | C | A | 2 | 2 |
| 27 | C | B | 1 | 1 |
| 28 | C | B | 1 | 2 |
| 29 | C | B | 2 | 1 |
| 30 | C | B | 2 | 2 |

The multiple navigation solutions may be compared. If one or more of the navigation solutions is not consistent with the other navigation solutions, the system processor 208 may discard the inconsistent relative navigation solutions. In this manner, the failure of a GPS receiver and/or an inertial sensor may be detected and isolated by the system processor 208. A threshold for identifying inconsistent navigation solutions may be adjusted based on the requirements of aerial refueling. Aerial refueling requirements may be set by one or more regulatory agencies.

Figure 3:
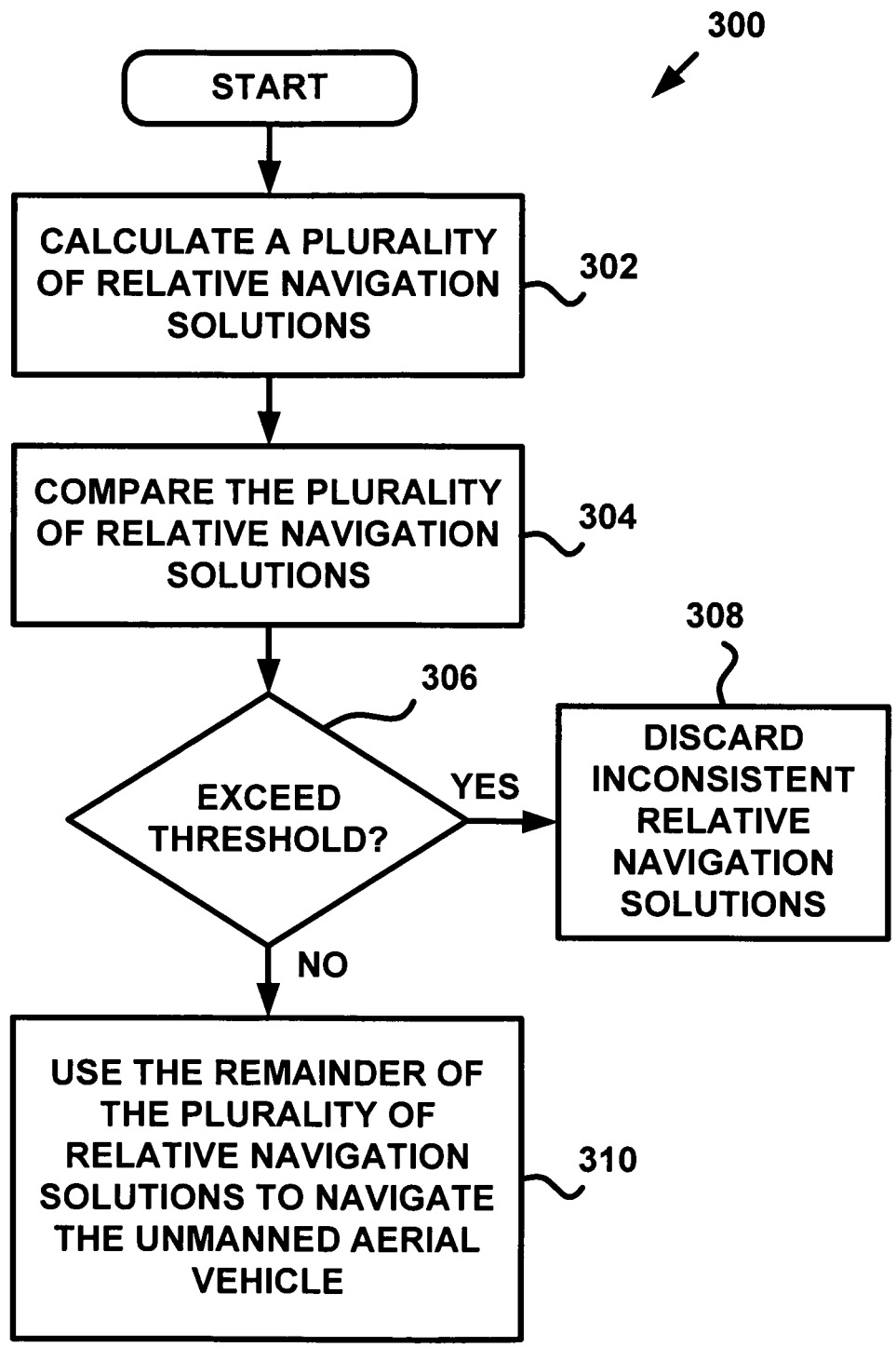
FIG. 3 is a flow diagram of a method for providing integrity of a navigation solution calculated using the system depicted in FIG. 2.

FIG. 3 is a flow diagram of a method 300 for providing integrity of a relative navigation solution calculated by the system 200. At block 302, a plurality of relative navigation solutions is calculated by the system processor 208. The type of relative navigation solution can vary based on the data available to the system processor 208. The number of relative navigation solutions calculated depends on the number of EGI systems on board the UAV 102 and the tanker aircraft 104, and the currently available data from each sensor. Preferably, each of the solutions has the same baseline (assumes lever arms between EGI systems and accompanying GPS antennas).

At block 304, the relative navigation solutions are compared with each other. The comparison detects whether any of the relative navigation solutions is inconsistent with the other solutions. An inconsistent solution may be an indication that one or more of the GPS receivers and/or inertial sensors is malfunctioning. The consistency information may be used to form a protection level for the relative navigation solution.

At block 306, the relative navigation solutions are compared to a threshold, such as the protection level determined by the consistency information. At block 308, if a particular relative navigation solution exceeds the threshold, the system processor 208 discards the solution. Otherwise, at block 310, the solution is used to navigate the UAV 102 during aerial refueling. As a result, the UAV 102 may safely and efficiently rendezvous with the tanker aircraft 104 for aerial refueling.

It should be understood that the illustrated embodiments are examples only and should not be taken as limiting the scope of the present invention. For example, while the navigation processor 206 and the system processor 208 are described as two separate processing units, it is understood that the functions of the navigation processor 206 and the system processor 208 can be combined into a single processing unit. Alternatively, the INS 202 may host the navigation processing function.

Additionally, it is also understood that the functions of the navigation processor 206 and the system processor 208 can be hosted by more than two processing units. For example, the navigation system 200 on the UAV 102 may include three processing units. In addition to the navigation processor 206 and the system processor 208, the navigation system 200 may also include a stand-alone relative navigation processor.

The claims should not be read as limited to the described order or elements unless stated to that effect. Therefore, all embodiments that come within the scope and spirit of the following claims and equivalents thereto are claimed as the invention.

I claim:

1. A system for aerial refueling navigating an unmanned aerial vehicle relative to a tanker aircraft, comprising in combination:
   a processor;
   data storage; and
   machine language instructions stored in the data storage executable by the processor to:
   calculate a plurality of relative navigation solutions between an unmanned aerial vehicle and a tanker aircraft;
   compare the plurality of relative navigation solutions to identify relative navigation solutions that are within a threshold value of each other; and navigate the unmanned aerial vehicle with respect to the tanker aircraft using the relative navigation solutions that are within the threshold value of each other.

2. A system comprising in combination:

an Inertial Navigation System;

a Global Positioning System; and a system processor that receives data from the Inertial Navigation System, the Global Positioning System, and a tanker aircraft, wherein the system processor calculates a plurality of relative navigation solutions between the unmanned aerial vehicle and the tanker aircraft based on the received data, wherein the system processor compares the plurality of relative navigation solutions to detect whether any of the plurality of relative navigation solutions is inconsistent with the other solutions, and wherein the system processor uses consistency information obtained from the comparison to form a protection level for the plurality of relative navigation solutions.

3. The system of claim 2, wherein the system processor identifies at least one of a Global Positioning System receiver and an inertial sensor that is malfunctioning if at least one of the plurality of relative navigation solutions is inconsistent with the other solutions.

4. The system of claim 2, further comprising a navigation processor that receives data from the Inertial Navigation System and the Global Positioning System, and provides information regarding the unmanned aerial vehicle to the system processor.

5. The system of claim 2, wherein the plurality of relative navigation solutions is calculated using a navigation solution for each of the unmanned aerial vehicle and the tanker aircraft selected from the group consisting of a Global Positioning System-only solution, a loosely coupled solution, and a tightly coupled solution.

6. The system of claim 2, wherein the plurality of relative navigation solutions is calculated by taking a difference between data obtained from the tanker aircraft and the unmanned aerial vehicle to obtain a loosely coupled relative navigation solution.

7. The system of claim 2, wherein the plurality of relative navigation solutions is calculated by using a Kalman filter to obtain a tightly coupled relative navigation solution.

8. The system of claim 2, wherein the plurality of relative navigation solutions depends on a distance between the unmanned aerial vehicle and the tanker aircraft.

9. The system of claim 2, wherein the plurality of relative navigation solutions depends on a number of Global Positioning Systems and inertial systems located in the unmanned aerial vehicle and the tanker aircraft.

* * * * *